(No Model.)

H. B. CHESS.
ROLLING MILL.

No. 321,794. Patented July 7, 1885.

WITNESSES
T. Walter Fowler
H. B. Applewhaite

INVENTOR
Harvey B. Chess
per A. H. Evans & Co.
Attorneys.

(No Model.)  H. B. CHESS.  6 Sheets—Sheet 2.

ROLLING MILL.

No. 321,794.  Patented July 7, 1885.

(No Model.)　　　　　　　　　　　　　　　　　　6 Sheets—Sheet 4.
H. B. CHESS.
ROLLING MILL.
No. 321,794.　　　　　　　　　　　　Patented July 7, 1885.
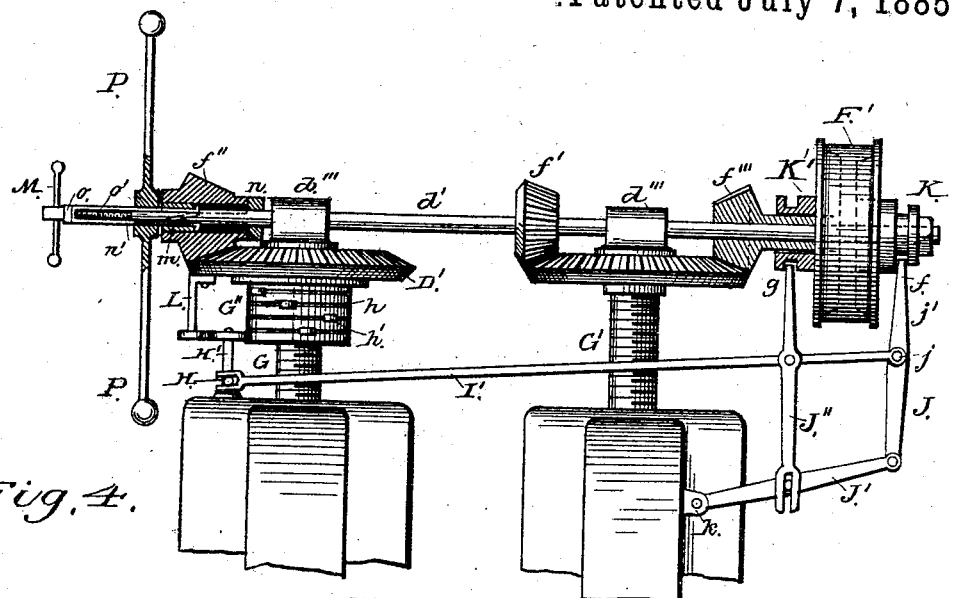
Fig. 4.
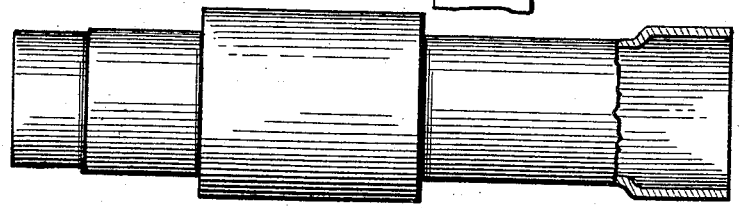
Fig. 10.
Fig. 5.
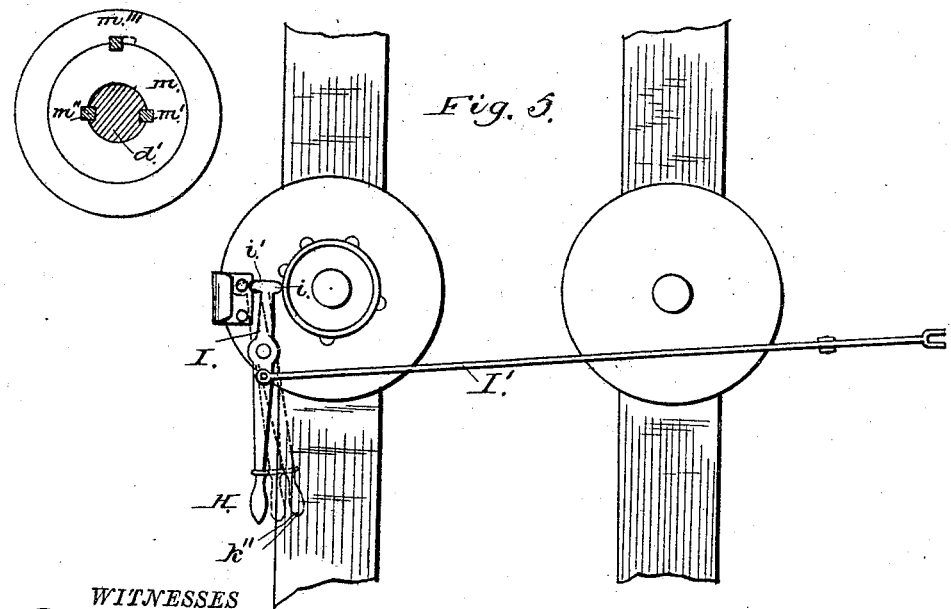
WITNESSES　　　　　　　　　　　　　　INVENTOR
T. Walter Fowler　　　　　　　　　　Harvey B. Chess
H. B. Applewhaite　　　　　　　　　By A. H. Evans & Co.
　　　　　　　　　　　　　　　　　　　　Attorneys (No Model.) 6 Sheets—Sheet 5.

H. B. CHESS.
ROLLING MILL.

No. 321,794. Patented July 7, 1885.

WITNESSES
T. Walter Fowler
H. B. Applewhaite

INVENTOR
Harry B. Chess
per A. H. Evans & Co.
Attorneys.

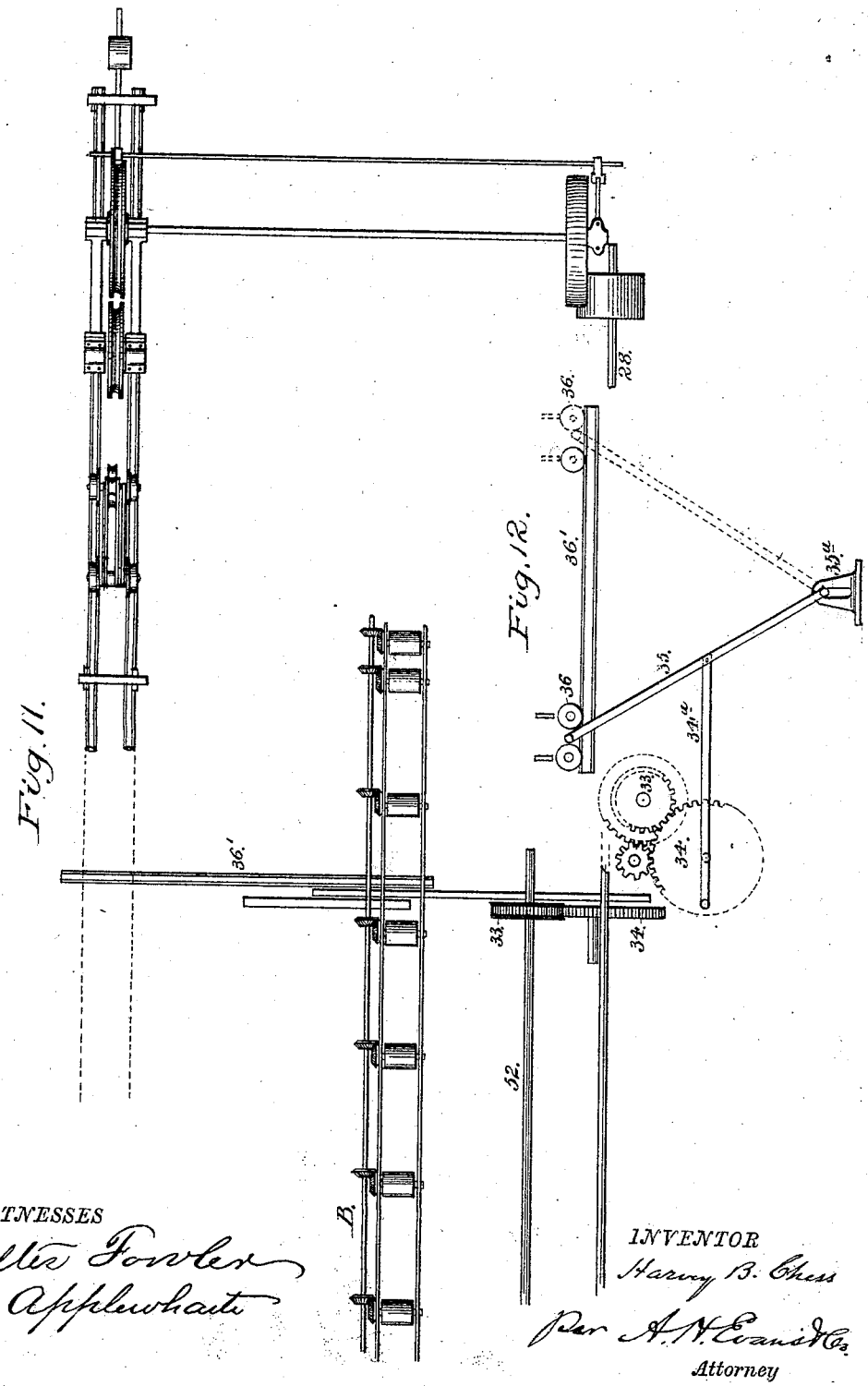

UNITED STATES PATENT OFFICE.

HARVEY B. CHESS, OF PITTSBURG, PENNSYLVANIA.

ROLLING-MILL.

SPECIFICATION forming part of Letters Patent No. 321,794, dated July 7, 1885.

Application filed May 9, 1885. (No model.)

*To all whom it may concern:*

Be it known that I, HARVEY B. CHESS, a citizen of the United States, residing at Pittsburg, in the county of Allegheny and State of Pennsylvania, have invented a new and useful Improvement in Rolling-Mills, of which the following is a full, clear, and exact description, reference being had to the accompanying drawings, forming part of this specification, in which—

Figure 1:
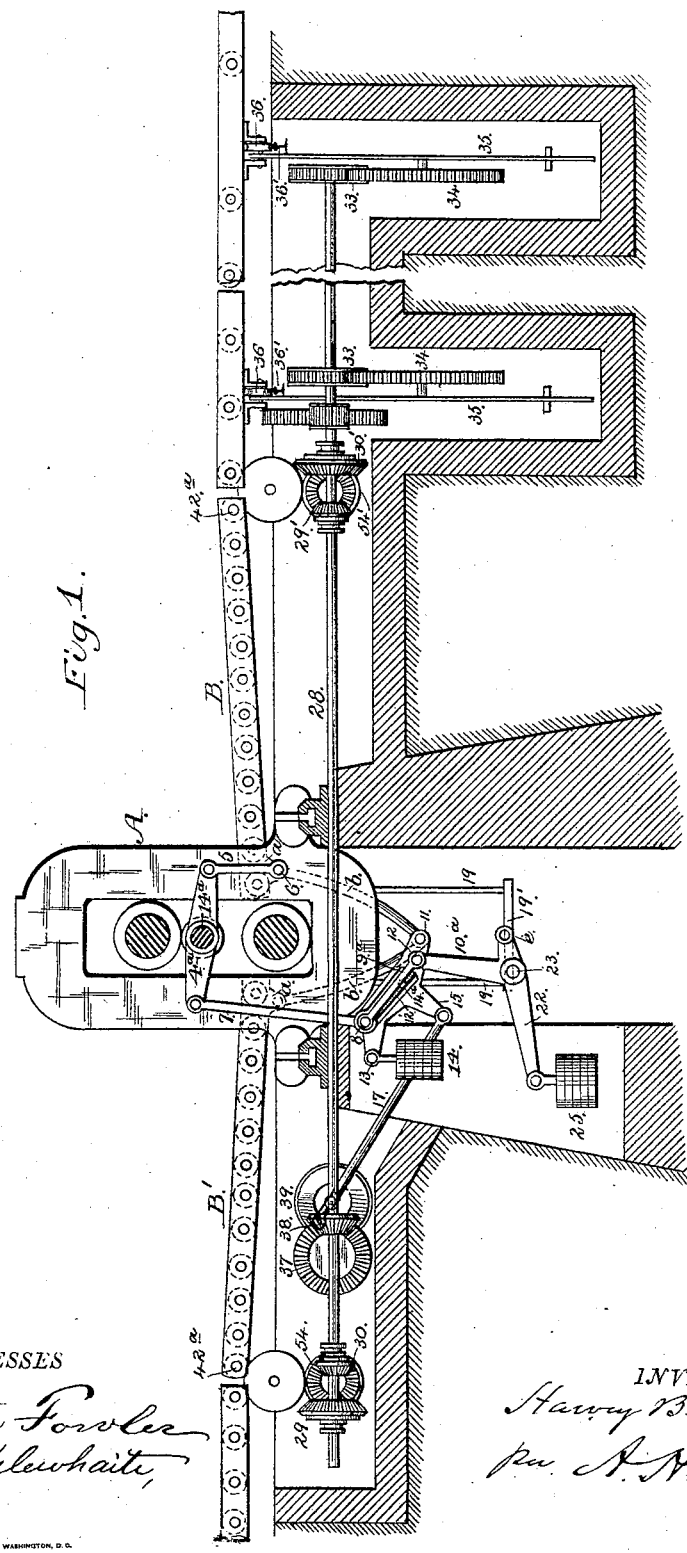
Figure 2:
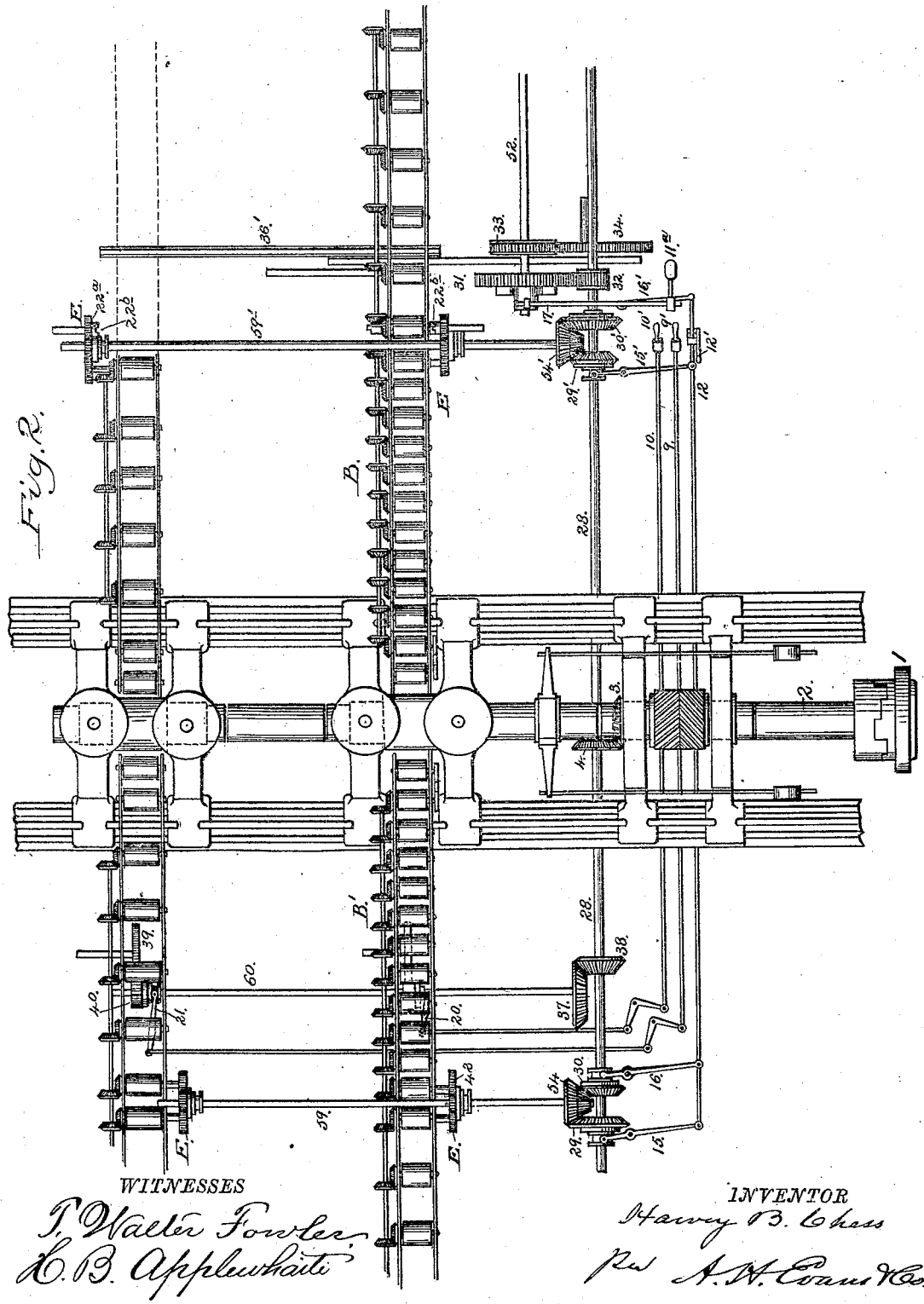
Figure 3:
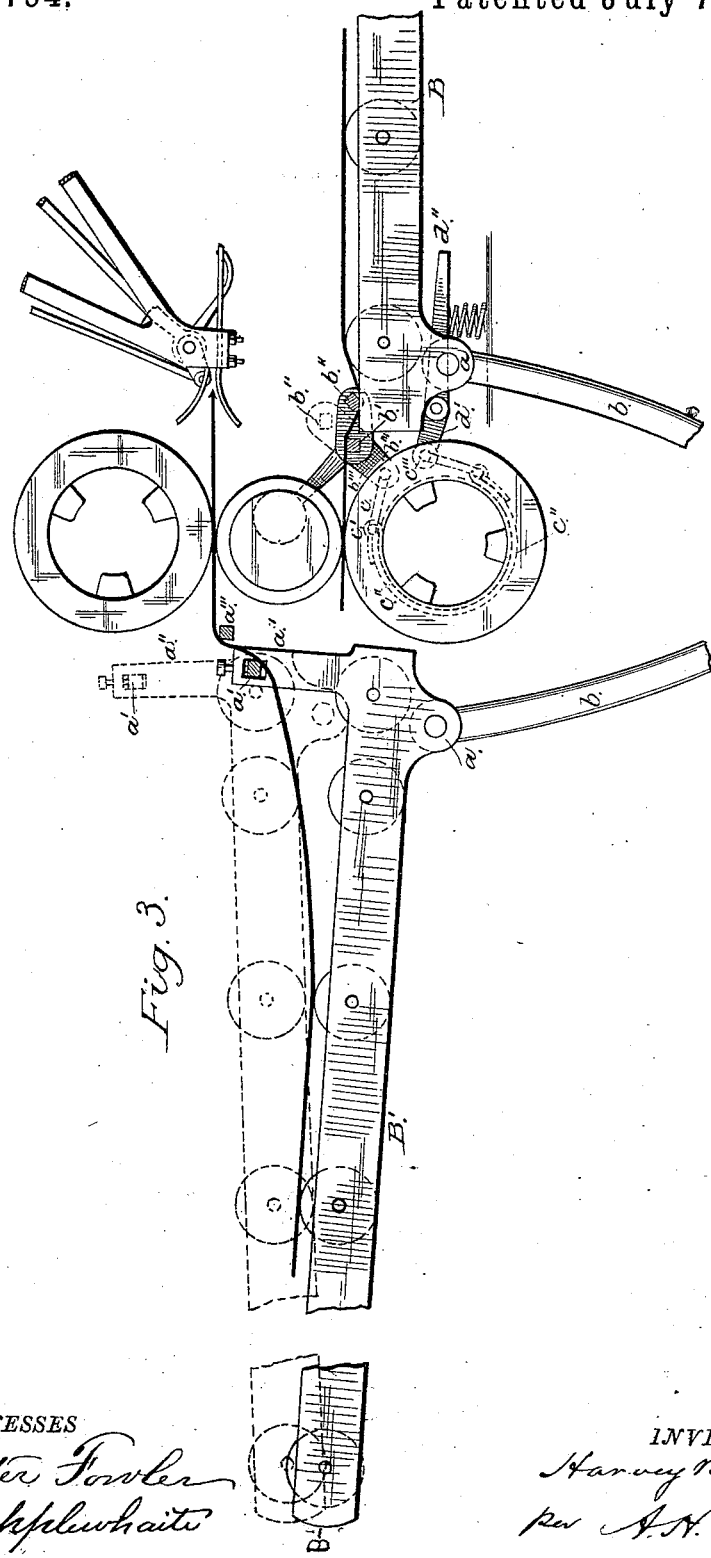
Figure 6:
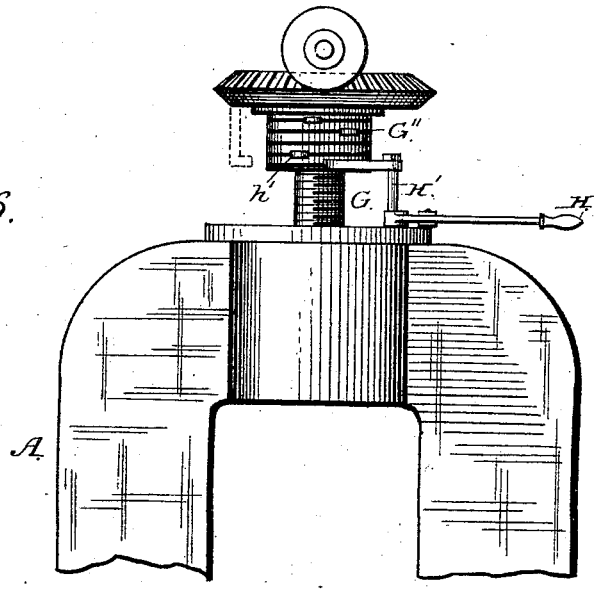
Figure 7:
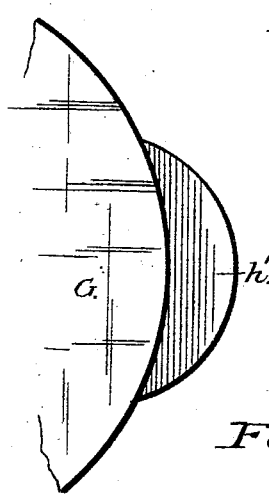
Figure 8:
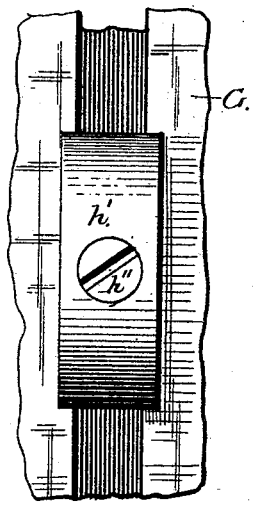
Figure 9:
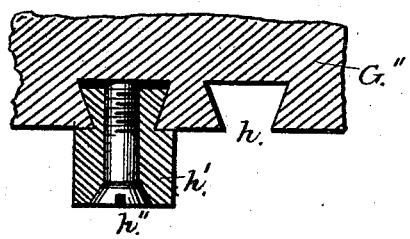

Figure 1 represents a side elevation of a rolling-mill with my improvements attached. Fig. 2 is a plan view of the same. Fig. 3 is a side elevation, partially in section, showing the improved devices for scraping the plates. Fig. 4 shows my improved arrangements for operating the regulating-screws in the top of the housing. Fig. 5 is a bottom plan view of Fig. 4. Fig. 6 is an end view of the same. Figs. 7, 8, 9, and 10 represent details of construction, to be hereinafter referred to. Fig. 11 represents in plan the end of the table illustrated in Fig. 2. Fig. 12 represents the device for transferring the feed-tables from one track to another.

The object of my present invention is to provide an improved method of manipulating rolls, roll-trains, and rolling-mill tables; and it consists in the several combinations of devices hereinafter explained, and particularly pointed out in the claims.

Ordinarily the tables of rolling-mills are supported and operated by means of links attached underneath the tables, and coupled by means of bell-cranks, and worked by means of hydraulic power or hand.

My invention involves two stands, each of three high rolls arranged as in the well-known "Lauth system." It consists of a stand, A, Fig. 1, with three such rolls driven from the usual three high pinions by intermediate spindles, and an improved mechanism for working the middle roll and tables by power.

In my invention I couple both the links $a$ by arms $b$ to wrist 11 on an arm, 12, of the rock-shaft 14ª. This secures a simultaneous movement to both of the tables B B'. The arm 12 has a depending arm, 15, to which is pivoted a link, 17, driven by a crank-arm or wrist on wheel 39. (See Fig. 1.)

It is evident if wheel 39 be given a half-revolution and then be stopped, or be given a series of such half-revolutions and stops, the tables will move from their lower position to their higher position, or vice versa, corresponding to the place for delivery and reception of metal to be rolled. The wheel 39 is driven by pinion 40, of just half its diameter, and the pinion is mounted on the shaft 60, (see Fig. 2,) which in turn is driven through bevels 37 and 38 by the longitudinal shaft 28, which again in turn is driven by miters 3 and 4 through shaft 2 by wheel 1 on the main crab at the main shaft driving the train, the shaft 60 being thus driven at a definite speed. The pinion 40 is placed loose on the shaft 60, and is made capable of giving one revolution, when it may be stopped by means of the well-known "stop-up" movement used in punches, shears, &c. One revolution of the pinion will give a half-vibration of the tables. On the free end of the arm 12 is attached the weight 14 by means of the rod 13. Thus both tables are counterbalanced, and have in rising and falling an accelerating and gradually slowing movement of the crank-motion.

The tables B B' have a fixed movement, which is adjusted to the diameter of the middle roll. This may be varied slightly by the crank arm or pin in wheel 39, and the tables are moved to each position by withdrawing the detents 20 and 21, by means of the rods 9 and 10 coupled to levers 9' and 10'. (See Fig. 2.) It will be evident that while the tables have a fixed movement always through an arc whose chord approximates the diameter of the middle roll, this roll will have a varying movement or amount of travel.

The upper rolls are sustained in the usual manner, and have an upward movement given them by the supporting-rods 19, attached to the carriage 19', placed beneath them. Through a bridle the lower ends of these rods are supported and actuated by lever-arm 22 and weight 25. The upper rolls are controlled and screw downward in the usual manner by the housing-screws. (Shown in Fig. 4.) The middle roll has a position on the lower roll or upper roll alernately as the metal is passed through alternately between the upper and middle rolls or between the middle and lower rolls. It is evident that this position of the middle roll is opposed relatively to that of the tables in working—that is, when the tables are up the middle roll is down, and vice versa. In this system of roll-trains the middle roll is usually alternately pressed to the top or bottom roll, as the "pass" required may be above or below the middle roll. When the opening between the rolls is not considerable—that is, when the material to be rolled is not of considerable thickness—the pressing of the roll has heretofore been accomplished by counterbalancing the roll and working it by hand, and independent of the tables or larger rolls, and with greater opening by independent and independently-worked hydraulic or steam apparatus, demanding for this placing in position for each pass the special attention of a skilled attendant.

By my present improvement this relation of the tables to the middle roll, when placed in position for a pass, enables such a coupling of them as to be completely independent—that is, the adjustment of the tables shall adjust the middle roll to its position. The movement of each being reciprocal, they are coupled or so connected that the operating of the one readily adjusts the other; but while it is evident that while the tables have a fixed amount of movement, that of the middle roll is variable. When a slab or ingot of, say, six inches is to be rolled, it is lifted or raised to a distance somewhat less, and the middle roll will travel through an equal space. When, by frequent passes, the material has been reduced to, say, three inches, this opening between the rolls will be proportionately diminished, and the play of the middle roll will be limited to the same diminished space. When less dimensions are reached this play is successively reduced until zero is reached or no opening remains, when no play of the middle roll can or will take place.

This graduating of the movement of the middle roll is accomplished by the horizontal levers $4^a$, pivoted to the links 5, which in turn are supported by the yielding wrist 6, the levers 4 crossing outside the housing, but inclosing the projecting and somewhat reduced necks of the middle rolls, so that any movement up or down of the other ends of the levers shall communicate the same movement to this roll, greater or less, as the case may be—less by the yielding of the spring-sustained pivot wrist 6. The function of this yielding wrist 6 will be made apparent hereinafter.

On the arms 12 I form a slot, 12', outside the line of the housing, and so adjust its direction and position that when the middle roll is in its upper position of maximum opening, a link, 7, connected with the outer end of horizontal lever 4 shall be of just such length to reach a sliding wrist and block, 8, carried in the said slot, (see Fig. 1,) and at the outermost limit of said slot. This slotted arm 12 is rigidly keyed on the rock-shaft $14^a$ in such relation to the arm 15, coupled to and actuating the tables B B', that when the tables are down the slotted arms are up. It is obvious that when the tables are down the middle roll shall be up, and vice versa. If in practice the middle and upper rolls were not to be closed, this coupling of the tables to the horizontal levers would suffice; but with the reduction of the metal at each pass the space moved through by the middle roll must become less. This must be provided for, so that the mutually-dependent relation shall be maintained until the minimum of thickness shall be reached.

The shaft 23 that carries the counterbalancing-lever 22, through which the weights 25 sustain the upper roll have upright arms $10^a$, each keyed rigidly to the shaft, with their upper ends connected through links $9^a$ to the sliding wrists 8. (See Fig. 1.) The length of the links $9^a$ and position of upright arms is such that when the weight 25 is down and the upper roll, through its sustaining-rods 19, is up the wrist 8 is held to the outer limit of the slot $12^a$ and the movement of the wrist is through an arc sufficient to adjust the middle roll to each position of full up or down. When, however, the upper roll is screwed downward to a closer position, the upright arms $10^a$, through the action of the rods 19, saddle 19', and shaft $e$, draw the sliding wrists 8 toward the center of motion of the arm in which it slides. This position of nearer the center of motion necessarily gives a lesser arc of movement to the sliding wrists 8 and a correspondingly less motion to the middle roll, and this, too, without interfering with the fixed amount of movement of the tables. Successive downward movements of the upper roll produce successive and related movements of the wrists 8 toward the center of motion, while the related movements of the table remain the same. When the top roll arrives in the position of closed, the sliding wrists 8 will have reached the rock-shaft $14^a$ and no further motion will ensue, and consequently no further movement will be given to the middle roll. The middle roll and its supporting-bearings may be balanced.

In working it is essential that the middle roll shall be pressed firmly to that roll with which it is to remain during the pass. To accomplish this I provide an overstroke or excess of movement of the horizontal lever $14^a$, which excess is lost at the double-movement yielding support at 6, Fig. 1. This yielding support self-adjusts for wear of the rolls, and is so constructed as in turn to be itself adjustable. It will be observed that the travel of the middle roll is the "eccentric-movement" motion given the tables, and is accomplished without shock to the rolls or to the other parts of the machine. Thus the middle roll has an automatic movement through and by the same mechanism that actuates the tables, but automatically graduated and adjusted by the position fixed for the top roll.

The feed-roller tables are provided for the handling by power of the material to be rolled. Those portions of the tables adjoining the rolls are pivoted at $42^a$, while the ends nearest the rolls are capable of being moved up and down through a distance approximating the diameter of the middle roll. All the tables are provided with the usual driven rollers, which are capable of being driven in either direction. These rollers are usually worked by an independent pair of engines; but by my invention these rollers are driven by the same engine that drives the train, and therefore their circumferential travel has a fixed relative speed to that of the rolls. I do not merely couple the rollers on one side with those on the other side of the rolls, thus giving both sets the same relative speed; but my purpose is to give those table-rollers delivering the material to the rolls a less or retarding speed of travel than the rolls themselves, while the rollers receiving the rolled material have a greater or drawing speed. In returning the metal through the upper passage the action of the rollers is reversed, and the delivery-set again travel slower and the receiving-rollers at a higher rate of speed than the roll-surfaces. The purpose of this alternating relative travel will be hereinafter explained.

The shafts 59 59', Fig. 2, have each two sets of bevel-wheels, 54 54', which remain in gear with bevels 29 30 and 29' 30' on the driving-shaft 28, placed as shown, Figs. 1 and 2. These bevels 29 30 and 29' 30' are free to revolve or to allow the shaft to revolve in them until the one or the other is driven by means of a friction-clutch on its back. These clutches are coupled in pairs by the levers 15 16 and 15' 16' and rod 12 in such a manner that when the slower driving speed-bevel 30 is clutched on the entering side of the train the higher speed one 30' is clutched on the delivery side. For re-entering the material, the other coupled pair of bevels are thrown into action and a reverse of the motion of the feed-rollers takes place, but with a reversal of the same differential speeds, as before. The rod 12, by which the bevels 29 30 and 29' 30' are controlled, is in turn operated by the lever 12'. It is evident that a middle position of this lever would give no motion whatever to feed-rollers, while, if carried to its limit of movement in opposite directions, opposite motions of the feed-rollers will be secured.

When it is necessary to move the rolled plates to the finishing-stand, (see Figs. 2, 11, and 12,) a portion of the table B, with its rollers, is detached and moved to a position opposite the finishing-rolls by means of the transversely-placed car-wheels 36, running on short sections of transverse track 36', placed at proper intervals. Beneath these several table tracks or wheels are suspended bars 35, whose lower ends are provided with crank-arms, which play in the vertical guides $35^a$. (See Fig. 12.) About the middle point of these depending bars 35, I pivot links $34^a$, whose opposite ends are attached to and are driven by crank-pins in wheels 34. These wheels 34 are in turn driven by pinions 33, of exactly half their size, so that a full revolution of the pinion will give a half-revolution of the wheel. These pinions are mounted at the various places required on the shaft 52, (see Figs. 2 and 11,) which is driven at a proper and fixed speed by the pinion 32 on the shaft 28, which gears into 31 on shaft 52, and drives 31 constantly, 31 being loose on the shaft. A "stop-up" clutch on the shaft 52, in connection with wheel 31, causes the shaft 52 to make one revolution and then stop, when a locking dog or pawl is withdrawn. (See Fig. 2.) The line-shaft 52, revolving once, causes the wheels 34 to go through a half-revolution, and these, coupled to the table, as shown in Figs. 2 and 12, cause it to travel from one position to the other, as indicated in dotted lines, and to rest in that position until again required to be removed to the opposite position in connection with the first train. By this means the two trains of rolls are caused to act in perfect concert, the material being rolled being thus automatically passed from one train of rolls to the other or finishing rolls.

The driving of the feed-rollers in each position of the movable table is accomplished by the driving-gear at E E, Fig. 2, being on the opposite sides and outside of the tables, while in the first position, Fig. 1, the power is communicated by pinion 42, but in the second position by $22^a$. This power is communicated through cone friction-clutches or yielding square-jogged crabs $22^b$, which yield sufficiently to permit the table to reach its position, but at the first revolution to fall into place and drive the system. Thus it will be evident that in either position the table will discharge its function of delivering and receiving materials, and automatically change its position by a parallel transverse movement of the material to be worked. It will be noted that the movement given the table is that of the eccentric movement, the table starting and stopping gently, and the detent being managed through the shaft 17 (see Fig. 2) and pedal $11^a$ by the same attendant who manages the levers controlling the direction of the feed.

In finishing plates it is necessary to give them the abrupt bending usually called "scraping," just before the material enters the rolls. This bending causes the heavy stiff scale to leave the bending and yielding material. Over the table and close to the rolls is mounted an adjustable transverse bar, $a'$, and is held in supports $a''$. On the guide-box is another transverse bar, $a'''$. (See Fig. 3.) These bars are placed at such distance and in such relation to each other that when the table is down the material passing through the rolls must be bent at two points, as indicated in Fig. 3. The act of bending the plate is accomplished by first raising the table to its upper position and feeding in the plate. As soon as the rolls have taken firmly hold of the plate the table is dropped into its lower position for receiving a pass, where it remains for that purpose. By thus dropping the table the transverse bar a' strikes the plate and bends it below the bar a''', as illustrated in Fig. 3. This performance of dropping the table to cause the scraping is accomplished by the same lever that works the table.

On the return pass it is also important to scrape the plates, especially as that part first entering the rolls receives no scraping. A fixed bar, b', is mounted transversely, as before, (see Fig. 3,) over which the plate passes to the rolls. A swiveled bar, b'', is so mounted that when its position is up, as shown in dotted lines, it interposes no obstacle to the entrance of the plate; but when revolved into position, as shown in full lines, it bears down upon the plate, and the same double bending takes place as before. This detail of bending is not new, but instead of working in the usual way, by hand and a special attendant, I attach to the arm b''' a link, c, whose other end is attached at c' to a light spring brake-strap, c'', partially surrounding the outer and adjacent coupling of lower roll, or, rather, a flanged brake-pulley attached to this coupling. The other end of this brake-strap is attached at c''' to and receives an upward movement by the lever d', whose free end forms the pedal d''. By depressing the pedal and tightening the strap the friction of the revolving pulley takes with it the strap to the limit of movement and holds it there as long as may be necessary. This throws down the swivel-bar b'', and scrapes the plates. This function of scraping and scaling the plates is not the only essential one performed by this part of my invention. It is very important for straight and true rolling that the plate shall be somewhat retarded or held back to secure a straighter entrance of the plate, and consequently a straighter delivery. This bending of the plate at each pass materially assists the manner of entrance and delivery.

I have provided a method of automatically stopping the screwing down of the upper roll at the proper point for the passage of the material. Thus, for instance, at the first pass the opening may be six inches, for the second pass five inches, and for the third pass four and three-quarter inches. The movement of the roll is up or down, and screw-head, bevel-wheel D' and gear and shaft d', Fig. 4, all move with it. The shaft d' is supported by bearings d''', the bases of which are circular and fitted to the top of wheel D'. It is evident that a belt from the upper roll to pulley F' will drive the latter continuously in one direction. By clutching the shaft d'' to the pulley F', (which ordinarily runs loose on shaft,) by fork f, I can drive the shaft, which, through the pinions f'' and f''', will drive the screws G G' downward and set the rolls closer; but if I clutch pulley F' by using the fork g, which is feathered to pinion f'''', I reverse the motion of the screws, and permit the roll, by reason of its excess of counter-balance 25, (see Fig. 1,) to rise. The screw G has on its upper end a shell or drum, G''. This drum has on its outer circumference screw-threads cut to exactly match the threads on the screw G, forming a micrometer. Since they rotate together, it is evident that if a pointer, fixed on the housing, be applied to the surface of the drum on the line of the thread mentioned, I can measure with great nicety the amount of axial travel, and also observe the position of the screws, and with this the opening of the rolls.

The attendant, in closing the rolls, usually watches for the coincidence of certain chalk or other marks on the drum-thread with the stationary pointer, and then, throwing out of gear his driving apparatus, stops the screwing down, and the opening between the rolls is prepared to receive the material. The novelty in this micrometer-drum is its automatically adjusting the closing of the rolls without the aid of skilled labor, for, should the opening between the rolls become too small for the work, through negligence or inadvertence of the attendant, a severe straining, or even breaking, of some part of the train might ensue.

The drum G'', instead of having a mere spiral line cut on its surface, has a spiral groove, h, (see Fig. 9,) (dovetailed in cross-section) cut to the same pitch as the thread on the screws G G'. At as many points on the drum G'' as stoppages of "screwing down" may demand I clamp small cams h' to oblong dovetailed nuts, running in the dovetailed groove h on the drum, by the screws h''. (See Figs. 4 to 9.) These cams are clamped in position identical with the chalk-marks before mentioned.

The lever H, Figs. 4, 5, and 6, is mounted on the housing by means of the stud H'. A short arm, I, of the lever H extends tangentially toward the drum, and is provided with toe i and heel i'. The toe i being made narrow, engages successively with the cams h as they successively and rotatively descend; and when this engagement with a cam occurs the arm I is forced outward, which in turn forces the rod I' inward, and this rod being attached at j to the vertical arm J, which is pivoted at its lower end to the bar J', the upper end, j', of the vertical arm is forced outward, and with it the clutch K, thus stopping the revolution of shaft d', and consequently arresting the descent of the roll. The vertical arms or clutch-levers J J'' move up and down with the gear, and are held in position by the horizontal bar or link J', pivoted to a fixed support, k, on the housing. The attendant, in managing lever H, to farther close the rolls, Figs. 5 and 6, now replaces it in its first position, where it remains until the next cam comes into contact with the toe i, when the lever is again thrown inward, as indicated in dotted lines at k', again stopping the descent of the roll, as before. By these successive operations the minimum of opening is attained by only successive automatic stoppings, the attendant of course awaiting the complete delivery of the metal between each movement.

After the lowest point has been reached, the lever H is put in position, as shown in dotted lines at $k''$, which so acts, through-rod I', vertical arm J'', and clutch K', as to revolve shaft $d'$ in the opposite direction, lifting the screws and allowing the roll to be raised by the weight 25, as hereinbefore explained. When the highest position of the screws has been reached, or a sufficient opening made, the depending vertically-adjustable cam L, Figs. 4, 5 and 6, which, having been adjusted to a proper point on the wheel D' and revolves with it, comes in contact at its lowest extremity with heel $i'$ of the short arm I, which during the rise of the parts is at the position shown in dotted lines at $k''$, when the arm I is forced inward, and, through the rod I', vertical rod J'', the clutch K' is released, thus arresting the upward movement and bringing the screws to a state of rest. A brake may be applied, say, to the hand-wheel P, to give quick cessation of movement, to be worked through a pedal by an attendant.

It will be observed that all the several parts—the lever, hand-wheel, and the pitch-adjusting wheel M—are so grouped together that they may be worked by the same attendant; and it will be further observed that these several automatic devices do not interfere with or obstruct any desired adjustment by hand through the ordinary hand-wheel P.

It is evident my automatic adjustment of the several parts will permit a higher speeding of the whole adjusting device, since there is no danger of "overrunning," and this secures a much more rapid rolling of the metal.

In rolling fine gages or numbers of metal, it is essential that perfect or nearly perfect parallelism of the axis of the rolls be maintained, and that the space between them shall be exactly the same at either end. No matter how carefully fitted and adjusted they may have been, a little more wear of parts at one end will destroy this relation.

A ready means must be had for setting one housing-screw forward or backward slightly. I use the usual bevel-wheels, as shown, and for a comparatively large amount of adjustment the pinion $f'''$ may be revolved or shifted one or more teeth; but this would give a minimum of capacity of only one tooth, which is not fine enough for practice. Besides, this fine adjustment must be accomplished between passes often and while heated metal is waiting.

Without describing usual and well-known methods, I will describe how I secure a minute correction at a convenient point. The bevel-pinion $f'$ is keyed tightly to the shaft $d'$; but the other, $f''$, is bored and fitted to the sleeve $m$, which has a certain amount of straight or longitudinal travel on the shaft. This sleeve is kept from rotation on the shaft by feathers $m'\ m''$, (see Fig. 10;) but it is provided on its exterior with an oblique or spirally-placed feather, $m'''$, which is fitted to a correspondingly-oblique feather-way in the pinion $f''$. Any movement of pinion $f''$ endwise is prevented by the collar $n$ and hand-wheel hub $n'$. The feathers $m\ m'$ are extended into the reins, which at $o$ are connected by a cross-head. A collared screw, $o'$, passes through this head and into the end of the shaft, and is rotated by the hand-wheel M.

It is evident that the act of turning the small hand-wheel M will send the sleeve one way or the other, and this will give such a partial rotation to the pinion $f''$ as to divide the space or pitch of one tooth, and this, while in gear with the screw-wheel D', will give the required delicate adjustment of the rolls. It will be noticed the relative position of the large hand-wheel P controlled by the roller and this adjusting hand-wheel permits a ready and convenient adjustment.

Metal, to be rolled straight, must not only be delivered straight to the rolls, but must be drawn out straight, if possible. Some form of material may be guided, as rods or rails; but we dare not regulate the hot and rather flaccid material of nail-plates by close guides, as any obstruction from mere retardation would be harmful. It must be allowed to go free; but one side may be held back as far as the weight and frictional contact will permit, and be drawn on the other side on the same principle. Again, should the plate be delivered faster than the table-rollers can receive it, it is evident the plate, unrestrained, could wander off sidewise; or, if on the entering side the speed of the plate be greater than the rolls, the tendency would be the same displacement of the material. To obviate these difficulties I regulate the speed of the delivery-table rollers and the receiving-table rollers, as before described, the receiving-table rollers each way moving at a somewhat greater speed than the delivery-table rollers, thus causing a draw on the plate as it is passing the rolls each way, thus keeping the material straight and securing perfect work. This is readily accomplished, as the rolls and table-rollers are all driven from the same source of power, and after proper adjustment the same relative speed must be retained.

For the final handling of the plates, and also to draw them from the rolls in an approximately-straight line, I do not depend on the table-rollers, but I have provided an automatic "catcher" and "drag-out;" but this device I will not describe here, as I have made it the subject-matter of another application, although to be used in connection with the apparatus herein explained.

Having thus described my invention, what I claim as new, and desire to secure by Letters Patent, is—

1. The combination, in a rolling-mill having movable tables which are automatically adjusted with relation to the middle roll, of slotted bell-crank levers, sliding crank arms or wrists engaging said levers, and mechanism, substantially as described, connected with the slotted levers, whereby a simultaneous movement is given both the tables and middle roll, substantially as and for the purpose described.

2. In a rolling-mill, the pivoted tables B B', in combination with slotted levers, movable wrists, and intermediate mechanism whereby the tables maintain their full movement independent of the fixed adjustment of the middle roll, substantially as described.

3. In a rolling-mill, the combination, with the stands A and the rolls, of the pivoted tables B B', provided with links $a$, the connecting-arms $b$ $b$, a crank-lever, and a gear-wheel, 39, whereby the tables are automatically moved from one position to another by the semi-revolution of said gear, substantially as herein described.

4. In a rolling-mill, the stands and rolls, in combination with the pivoted tables B B', provided with links $a$, the connecting-arms $b$, a lever having crank-arms 12 and 15, a link, 17, gear 39, and driving mechanism whereby the tables are moved from their lowest to their highest positions, or vice versa, by the semi-rotation of said gear, substantially as and for the purpose herein described.

5. In a rolling-mill, the stands A and upper and lower roll, in combination with the middle roll, the horizontal levers $4^a$, the links 5, supported by yielding wrist 6, the slotted crank-levers 12, a link, 7, and a sliding wrist, 8, substantially as herein described.

6. In a rolling-mill, the combination, with the stands and rolls of a shaft, 23, the counterbalancing-lever 22, and rods 19 for sustaining the upper roll, the arms $10^a$ on the shaft 23, the links $9^a$, and sliding wrists 8, the movement of said wrists being through an arc sufficient to adjust the middle roll to each position of full up or down, substantially as herein described.

7. In a rolling-mill, the combination, with the stand and rolls, of the shaft 23, counterbalancing-lever 22, the arms $10^a$, links $9^a$, sliding wrists 8, the rods 19, saddle 19', and shaft $c$, whereby the sliding wrists are drawn toward the center of motion of the slotted arms in which they slide, thereby giving a lesser arc of movement to the wrists and middle roll without interfering with the fixed movement of the tables, substantially as herein described.

8. In a rolling-mill, the rock-shaft $14^a$, horizontal lever $4^a$, the link 7, and mechanism for operating the lever, in combination with a yielding wrist, 6, whereby an excess of movement of said lever $4^a$ is lost by the double-movement yielding wrist 6, substantially as herein described.

9. In a rolling-mill, the tables B B', in combination with the shafts 59 59', the gears 54 54', adapted to engage gears 29 30 and 29' 30', the main driving-shaft 28, and a clutch mechanism for throwing the gears 29 29' or 30 30' into or out of engagement with the gear 54 54', substantially as and for the purpose herein described.

10. In a rolling-mill, the tables B B', in combination with a track, 36', the wheels 36, and suitable gearing for transferring portions of the table, with the rolled plates, to the finishing-stand, substantially as herein described.

11. In a rolling-mill, the tables B B', provided with detachable sections, in combination with the tracks 36', the wheels 36, suspended bars 35, the slotted guides $35^a$, and a mechanism for moving the sections and rolled plates from one stand to another, substantially as herein described.

12. In a rolling-mill, the combination, with the tables B B', of the detachable sections, the track 36', wheels 36, suspended bars 35, slotted guides $35^a$, pivoted links $34^a$, gears 34, provided with wrists for the links, pinions 33, and the gears 31 32, and shafts 28 and 52, substantially as herein described.

13. In rolling-mills, the means for driving the feed-rollers in each position of the movable section, consisting, essentially, of the driving-gears E, the pinions 42 and $22^a$, and suitable yielding clutch mechanism, whereby in either position the tables will discharge their functions of receiving and delivering material, substantially as herein described.

14. In rolling-mills, the tables B B', in combination with means for scraping the rolled plate, consisting, essentially, of an adjustable transverse bar, $a'$, a support, $a''$, and a transverse bar, $a'''$, substantially as herein described.

15. In rolling-mills, transversely-placed bars for bending and scraping at one operation the upper and lower surface of the rolled plate, in combination with the feeding-tables, substantially as described.

16. In roller-mills, the combination, with the tables, of a means for scraping the plate on the return pass, consisting, essentially, of a fixed bar, $b'$, a swiveled bar, $b''$, an arm, $b'''$, a link, a suitable brake-strap, a lever, $d'$, and pedal $d''$, substantially as described.

17. In rolling-mills, a mechanism for automatically stopping the screwing down of the upper roll, consisting of the stands, the screws G G', the bevel-wheels D', the shaft $d'$, the bearings $d'''$, having circular bases fitted to the wheels D', a loose pulley, F', and the pinions for driving the wheels D', substantially as described.

18. In rolling-mills, the stands A, the screws G G', and the gear-wheels D', in combination with the shaft $d'$, bearings $d'''$, pinions $f'$, $f''$, and $f'''$, the pulley F', the fixed and sliding clutches K and K', and suitable clutch-levers for giving an upward or downward movement to the upper roll, substantially as described.

19. In rolling-mills, the stand A and upper roll, in combination with the screw G, a shell or drum, G″, having threads or grooves $h$ on its outer circumference, a series of cams, $h'$, and levers and connecting-rods for shifting the position of the clutches, substantially as and for the purpose described.

20. As an improvement in rolling-mills, a drum, G″, provided with dovetailed grooves $h$, suitable nuts engaging the grooves and having the cams $h'$, in combination with the screw G, gear D′, and suitable connections for operating the clutches K K′, substantially as described.

21. In rolling-mills, the stands A, the upper roll, screw G, gear D′, and spirally-grooved drum G″, having the cams $h'$, in combination with a stud, H′, a lever, H, provided with an arm, I, a toe, $i$, and heel $i'$, a rod, I′, the clutch-levers J J″, a pivoted arm, J′, and the fixed and sliding clutches and gearing, substantially as herein described.

22. In rolling-mills, the screw G, gear D′, spirally-grooved drum G″, and cams $h'$, in combination with the lever H′, and a depending cam, L, secured to the wheel D′, and adapted to engage the heel $i'$ of the lever H′, substantially as herein described.

23. In rolling-mills, the shaft $d'$, screws G G′, and gears D′, in combination with a pinion, $f'''$, adapted to have a longitudinal movement on the shaft, and having an oblique feather-way, a sleeve, $m$, having an oblique or spirally-placed feather, $m''''$, and a hand-wheel, whereby one of the housing-screws may have a slight forward or backward adjustment, substantially as and for the purpose described.

24. In rolling-mills, the shaft $d'$, screws G G′, and gears D′, in combination with a sliding and spirally-grooved pinion, $f'''$, a sleeve, $m$, having a spirally-placed feather, $m''''$, the feather $m'$ and $m''$, a collar, $n$, a screw, $o'$, a cross-head, and a hand-wheel, substantially as herein described.

HARVEY B. CHESS.

Witnesses:
W. N. EASTON,
T. J. RODGERS.